Jan. 21, 1947.  H. H. PLATT  2,414,765
AIRSCREW DRIVE
Filed March 17, 1942  2 Sheets-Sheet 1

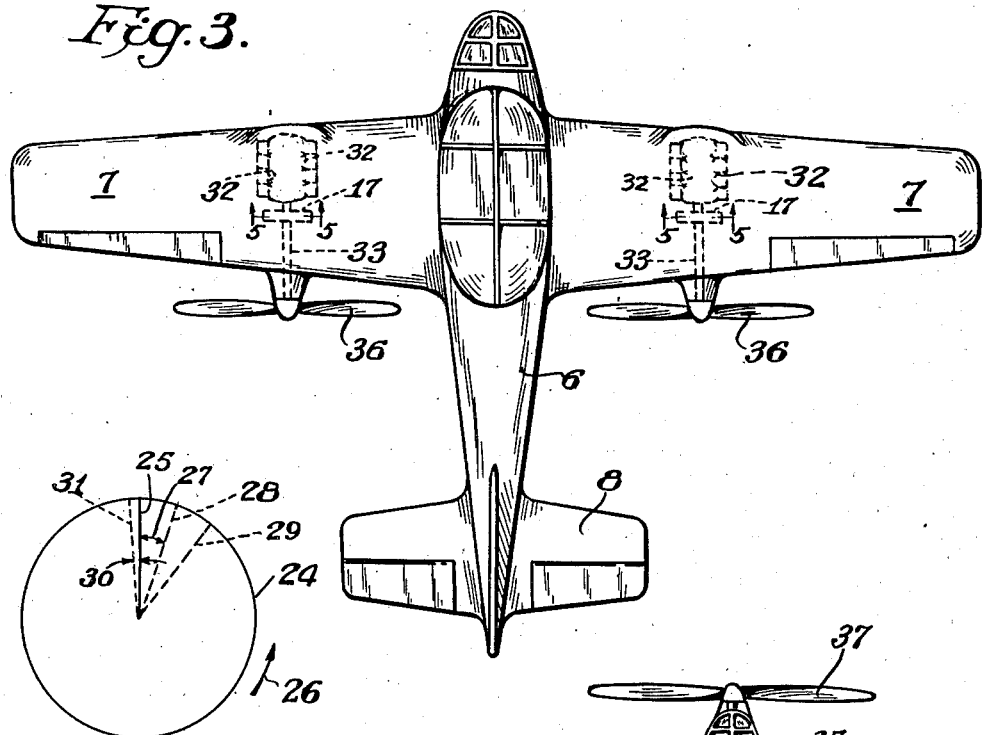
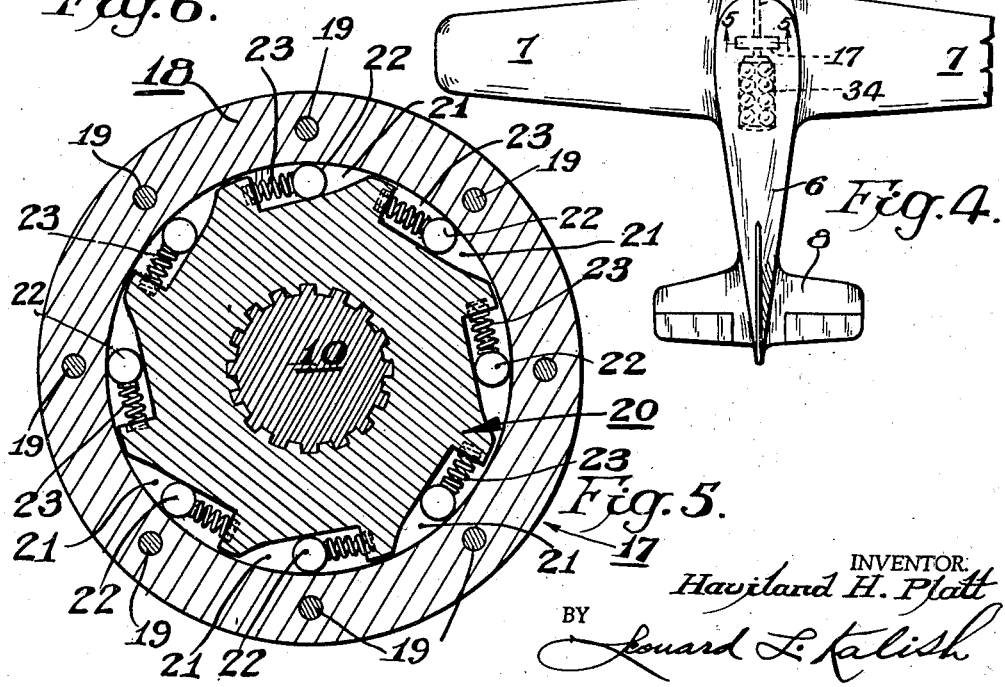

Patented Jan. 21, 1947

2,414,765

UNITED STATES PATENT OFFICE 2,414,765

AIRSCREW DRIVE

Haviland H. Platt, New York, N. Y., assignor to Rotary Research Corporation, Eddystone, Pa., a corporation of Pennsylvania Application March 17, 1942, Serial No. 435,001

2 Claims. (Cl. 244—60)

My invention relates to propulsion mechanism, and more particularly to the driving of the propellers of self-propelled craft in installations having the source of power located at a distance from a propeller which is driven through a long shaft.

It is well known that in such installations the rotating masses in the power plant, such as cranks, connecting rods, counterweights, armatures, or the like, interact with the rotating mass of the propeller to form an elastic system in which two masses are interconnected by a spring, the drive shaft acting as a torsion spring. An analogy is that of two flywheels connected by a relatively long and slender shaft. If one is rotationally displaced relative to the other, thus twisting the shaft, and then released the two flywheels take up an oscillatory motion and the shaft is twisted first in one direction and then in the other. The frequency of the oscillation so produced is constant and is determined by the moments of inertia of the masses, the length and section of the shaft and the shearing modulus of elasticity of the material in the shaft. If this resonant system is subjected from without to a steady succession of torsional impulses such as the piston forces of an internal combustion engine or the retarding impulses acting on a propeller blade passing a nearby obstruction and if these torsional impulses have approximately the same frequency as the natural resonant torsional frequency of the system, as defined above, an oscillation will be excited and amplified thereby until it assumes objectionable magnitude. When there is little frictional damping, as in the common case of a steel shaft supported in ball bearings the torsional oscillation at the critical speed unavoidably causes serious hammering of bearings, gears, etc., and frequently develops such large torsional stresses as to break the shaft either at the first trial or, through fatigue, after considerable running.

When the shaft is short in relation to its diameter its natural frequency of torsional vibration may be greater than that of any exciting influences acting in the engine or on the propeller at any possible operating speed. In such a case the resonant condition can never be excited and no need for correction exists. With practical dispositions, weights and speeds, however, the shaft would be of prohibitive diameter or of inconsequential length to meet this condition. Therefore in practice it is found in all installations having a remote propeller location that the torsional vibration frequency is lower than that of some of the normal or possible exciting frequencies. Since the exciting frequencies are invariably directly connected with the rotating structure they have constant values per revolution and so vary with the speed of revolution. Consequently it is impossible to bring the system up to maximum operating speed without running through one or more zones in which the imposed frequency coincides closely with the natural vibration frequency.

For these reasons no satisfactory solution to the torsional vibration problem in long shafts connecting power plants with propellers has hitherto been achieved. There have been known and extensively applied devices for increasing the damping friction present in the system and so reducing the amount of kinetic energy. This principle is not readily applicable for aircraft installations because the weight of such a device adequate to give suitable results is prohibitive. In any case, since the damping comes into effect only after some vibratory motion has developed, it is at best a limited palliative.

There has also been known and applied the principle of the resonant absorber which acts, through suitably disposed pendular weights, to neutralize an exciting impulse of known frequency per revolution. The resonant absorber is however, capable of neutralizing only the one exciting frequency for which it is designed. It is usually not practicable to install the considerable number of absorbers necessary to take care of all possible exciting frequencies. For example, in an aircraft power plant having a twelve cylinder engine and a three bladed propeller, in normal running the engine contributes a main torsional excitation from the cylinder impulses at the frequency of six cycles per revolution and piston drag periods of twelve and twenty-four cycles per revolution. With irregular running of the engine, as in cold starting, there may be a rhythmic firing of a lesser number of cylinders giving rise to periods at one, two, three or four cycles per crankshaft revolution. While such conditions are usually momentary they may nevertheless persist for the short time needed to build up a destructive resonance. The propeller may normally contribute a period of three or six cycles per propeller revolution, depending on whether the blades pass an obstruction once or twice a revolution.

In the case of a twin engine airplane both frequencies are present since each blade passes the fuselage once and the wing twice per revolution. If one blade is damaged or is set differently from the others it may give rise to additional excitations at one and two impulses per revolution. If reduction gearing is interposed in the propeller drive the propeller frequencies become differentiated from the numerically corresponding engine frequencies. Thus eleven forcing frequencies are possible for this design. With faulty gearing, impacts of the teeth in passing each other have been known to introduce still more excitation frequencies.

An object of my present invention is to provide means for limiting the amplitude of torsional resonant oscillation in long shafts interposed between engine and propeller, said means being of such a nature that the shaft is protected thereby against objectionable torsional vibration at all rotational speeds regardless of any exciting frequencies which may exist in the system.

A further object of my invention is to provide more efficient power plant and propeller installations in aircraft than have hitherto been possible, this purpose being achieved through the elimination of torsional vibration troubles in the long transmission shafts required to connect the power plant in its best location with the propeller or propellers in their optimum position. Thus it is well recognized that the most satisfactory position for the power plant of an airplane is in the thick portion of the fuselage near the center of gravity of the craft. In this position it offers the least interference with the smooth flow of air past the machine and at the same time contributes the smallest possible amount to the moment of inertia of the craft in turns and other maneuvers. The propeller, if only one is used, must however, be placed well in front of or behind the fuselage depending on whether it is of the tractor or pusher type. In either case a comparatively long shaft is required. An even more convenient arrangement of the propulsion mechanism is one in which two propellers are used instead of one, one propeller being located on each side of the fuselage either in front of or behind the wing. This arrangement provides better vision for the pilot, less interference with gun fire in a military machine, more space in the cockpit and higher propulsive efficiency through elimination of propeller-fuselage interference. The drive is then carried from engine to propellers through two sets of bevel gearing and shafts which are necessarily quite long. My invention aims to make possible these arrangements by eliminating the torsional vibration which would otherwise be destructive to shafting and gearing.

For the purpose of illustrating the invention there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the drawings in which like reference characters indicate like parts throughout:

Figure 3 represents a diagrammatic plan view of another embodiment having two engines driving separate pusher propellers.

Figure 4 represents a fragmentary diagrammatic plan view of another embodiment having one engine and one tractor propeller.

Figure 5 represents a diagrammatic cross-sectional view on an enlarged scale, along the line 5—5 of Figures 1, 2, 3 and 4.

Figure 6 is a diagram illustrative of torsional deflection in a shaft and the means of limiting it.

In applying my invention any suitable airplane arrangement may be used such as the fuselage 6 with the monoplane wings 7 and the conventional empennage 8.

Figure 1:
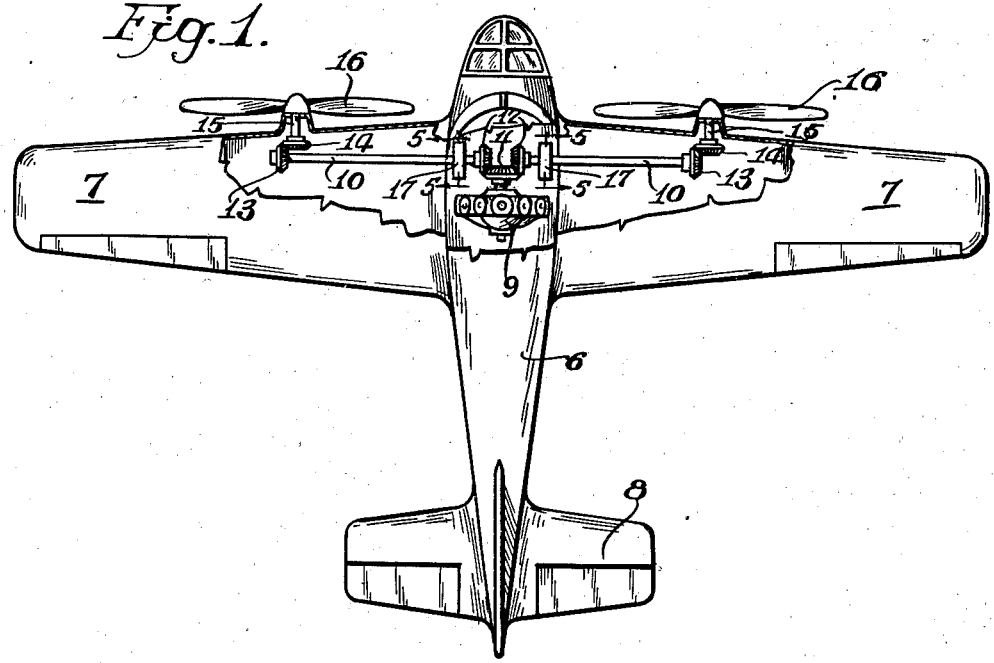
Figure 1 represents a diagrammatic plan view of an airplane showing one embodiment of my invention; wherein one engine drives two tractor propellers; parts being broken away better to reveal the construction.
Figure 2:
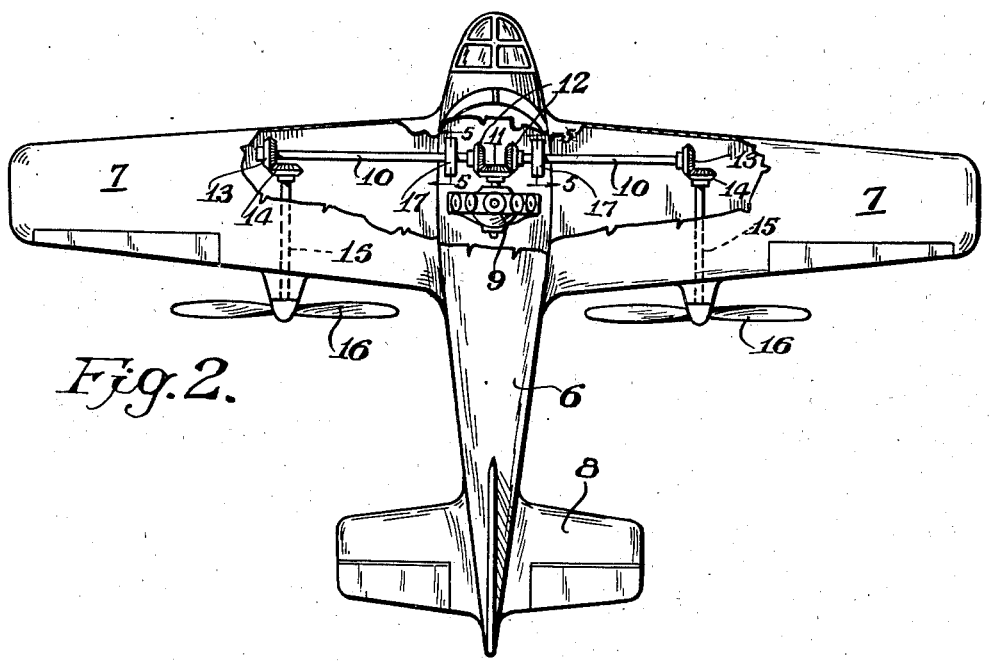
Figure 2 represents a diagrammatic plan view similar to that of Figure 1 of an airplane showing a different embodiment of my invention; wherein one engine drives two pusher propellers.

Figure 1 shows an arrangement with two tractor propellers, while Figure 2 shows arrangement with two pusher propellers. If it is desired to reduce the diameters of the propellers, as in a craft of very short wing span for exceptionally high speed, all four propellers may be used, that is, two pusher and two tractor propellers.

Any suitable power plant may be used, such as the radial internal combustion engine 9 placed in the thick portion of the fuselage 6 and close to the center of gravity of the craft. The crankshaft axis is substantially in line with that of the fuselage 6 and drives the transverse shafts 10 through the bevel pinions 11 and 12. The outboard ends of the shafts 10 carry bevel pinions 13 which mesh with bevel gears 14 to provide right angle drives through propeller shafts 15 to propellers 16 of any suitable type. As shown in Figures 1 and 2 the bevel gearing is so arranged that the right and left propellers revolve in opposite directions, thus neutralizing their torque reactions. Each of the transverse shafts 10 is formed in two parts with the overrunning clutch 17 interposed between them. The numbers of teeth on the bevel pinions and gears may be so chosen as to provide any speed reduction desired between the engine and the propeller.

The overrunning clutch 17 is illustrated in diagrammatic section in Figure 5. The outer shell or race 18 is cylindrical in form and is attached to one part of the shaft 10 by means of a suitable flange (not shown) and bolts 19. The inner race 20 is splined to the other part of shaft 10 and is formed with a plurality of recesses 21 in its outer surface. Retained in the recesses 21 are the rollers 22 which are held in position against the race 18 by springs 23. The wall of each recess 21 in contact with roller 22 is inclined with respect to the inner cylindrical surface of the outer race 18 so that the roller 22 is capable of being wedged firmly between races 18 and 20.

The operation of the overrunning clutch is as follows: when the inner race 20 is driven in a counterclockwise direction by the shaft 10 the rollers 22 wedge between the races 18 and 20, thus creating sufficient friction to carry race 18 around with race 20, the entire clutch rotating as a unit. When, however, a torque is applied to race 18 sufficient to cause it to rotate faster than the inner race 20, the rollers 22 roll toward the wider portions of the recesses 21 thus removing the driving pressure and permitting race 18 to turn freely relative to race 20. The result is that torque may be transmitted through the clutch unit in one direction only and that the two portions of shaft 10 are rotationally free of each other when torque is applied in the reverse sense. The springs 23 serve to keep the rollers 22 at all times in position for instant engagement. Suitable bearings (not shown) are provided to insure alignment of the shaft 10 and all parts of the clutch 17.

The principle whereby the overrunning clutch 17 limits torsional oscillation in the rotating system in which it is included is illustrated in Figure 6, in which the circle 24 represents an end elevation of a drive shaft of elastic material viewed from the driving end. The solid radius 25 represents a radial filament of the material of the shaft at the driving end. When the shaft is transmitting no torque a similar filament on the driven end, directly behind and in line with 25, may be taken as a reference element. If torque is now applied to the shaft in the direction of the arrow 26 the shaft 24 is twisted elastically, the reference element becoming thereby displaced relative to the element 25 through some angle 27 to the relative position 28. With the torque maintained at a constant steady value angle 27 remains constant and there is no torsional fluctuation in the shaft 24. When the torque fluctuates, rhythmically becoming greater and less than the steady value, the reference element is deflected alternately more and less than the angle 27. When the shaft 24 is driven by a source of fluctuating torque in which the amplitude of fluctuation is small compared to the mean torque, such as is the case with an internal combustion engine, the angle through which the reference element normally oscillates on each side of radius 28 is correspondingly small with relation to the angle 27. Furthermore if the shaft 24 has rotationally bound to it at each end an inertially important mass it will have a natural resonant frequency which is the frequency with which the reference element will oscillate elastically with relation to the filament 27 if the shaft is twisted and suddenly released.

Assuming further a case in which the frequency of torque fluctuation coincides with the natural frequency, as defined above, each torque impulse, being in phase with the oscillation left by the last one, adds energy to the swinging motion, thereby amplifying it. In a perfectly elastic system the oscillation would thus grow continuously in amplitude until the angular displacement was sufficient to twist the shaft to the breaking point. With an overrunning clutch such as 17 in the shaft and with the above conditions of resonance pertaining, the amplitude of the original oscillation of the reference element about the relative position 28 will amplify elastically until the reference element is swinging through the angle 27 on each side of its median position 28—that is until it swings from radius 25 to radius 29. When the amplitude of oscillation reaches this value, however, the system ceases to be truly elastic on account of the presence of the overrunning clutch. Thus let us assume that the reference element, having attained the amplitude of swing from 25 to 29, receives an added impulse sufficient to send it past 25 through the small angle 30 to the position 31. At the instant of its passing position 25 the overrunning clutch will release, because a reverse twist cannot be transmitted through it. Then as the oscillating motion reverses direction the clutch re-engages. The driven end of the shaft has therefore advanced rotationally relatively to the driving end through the small angle 30 and an amount of energy proportional to the product of the driving torque and the angle of advance has been added to that transmitted steadily. This energy is precisely the energy that would otherwise have acted to amplify the resonant swing. It is thus seen that the overrunning clutch serves to remove the surplus fluctuating energy from the system and to convert it into rotational energy of the driven member. Since this energy is always small in relation to the steady energy transmission in all practical cases, the angle 30 and the rate of increase of rotation remain infinitesimal. Thus the effect of the overrunning clutch is substantially to block the increase of amplitude and to place on any resonant oscillation as a limit the maximum angular displacement represented by the angle 27 which is the torsional angle caused by the mean driving torque. The maximum possible angular displacement under any condition of resonance is thus seen to be the angle between positions 25 and 29, that is twice the angle 27. In other words the following universal rules may be deduced:

In a torsionally elastic system containing an overrunning clutch interposed between inertially important masses the maximum possible torsional strain is twice the mean torsional strain and a resonant reversal of torque is prevented.

Since shafts are invariably designed with strength enough to transmit many times the expected mean torque, the above rule gives ample assurance against shaft failures through torsional resonance. Furthermore the impossibility of torque reversal makes equally impossible any hammering between gear teeth and in other clearances in the system, which is a well known evil resulting from torsional resonance.

If four propellers, that is, two pusher and two tractor propellers, are to be included in one machine, an additional overrunning clutch must be installed in one of the shafts 15 on each side of the gear 13 to prevent excessive torsional oscillations between the tractor and pusher propellers.

The position of the overrunning clutch along the shafting is entirely immaterial, as is apparent from consideration of the foregoing analysis. Thus in the design shown in Figure 1 one of the clutches 17 might be placed between the engine 9 and the pinion 11, both of them might be moved out close to pinions 13, or one or both might be placed anywhere in shafts 15, without in any way changing the results. The location of the clutches in practice will therefore be dictated by considerations of convenience, space and weight.

In the arrangement of Figure 1 the engine 9 may be equipped with a fan for air cooling, the cooling air being drawn in and forced out through suitable apertures in the fuselage skin. The propellers may be of fixed or controllable pitch or they may be equipped with automatic constant speed mechanism. If they are of the latter type the governor mechanism must be driven entirely from the propeller or from the portion of the shafting outboard of the overrunning clutch, since in some phases of operation, for example in gliding, the engine and inboard shafting may be stationary or revolving at a speed lower than that corresponding to propeller speed.

The arrangement shown in Figure 3 has twin outboard engines 32. These are of the horizontal opposed cylinder, or flat, type so that they may be inclosed within the outline of the wing section, thus reducing airflow disturbance to a minimum. With this type of engine installation pusher propellers 36 give an advantage in efficiency but require rather long shafts 33 to carry the drives back from the thick parts of the wings, which are invariably near the leading edges.

These shafts are safe-guarded against excessive torsional vibration, according to my invention, by the overrunning clutches 17 interposed in them.

The arrangement of Figure 4 shows a water cooled V-type engine 34 mounted within the fuselage, driving through the overrunning clutch 17 and the long shaft 35 the tractor propeller 37 mounted on the nose of the fuselage. The advantages of this arrangement over the conventional one with the engine at the nose of the fuselage are cleaner airflow lines, better pilot vision and more central location of the engine weight. The difficulties which would otherwise be encountered as the result of torsional resonance in the relatively long drive shaft 35 are eliminated, according to my invention, by interposition of the overrunning clutch 17.

I am aware that my invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. In an airplane, a fuselage, an engine in said fuselage, gearing in said fuselage operatively connected to said engine, a plurality of propellers external to said fuselage and remote from said gearing, a drive shaft operatively connecting said gearing with each of said propellers, and an overrunning clutch operatively interposed between each of said propellers and said gearing for inhibiting torsional resonance in said shafts.

2. In an airplane, a fuselage and wings extending on opposite sides thereof, an engine in said fuselage, gearing operatively connected to said engine, a plurality of propellers external to said fuselage and remote from said gearing, means mounting said propellers juxtaposed to and in front of said wings and in such position that part of the slip stream from the propellers strikes the leading edges of the wings, a drive shaft operatively connecting said gearing with each of said propellers, and an overrunning clutch operatively interposed between each of said propellers and said gearing for inhibiting torsional resonance in said shafts.

HAVILAND H. PLATT.